Patented Mar. 2, 1948

2,436,864

UNITED STATES PATENT OFFICE 2,436,864

DEHYDRATION PROCESS

Robert Johnson, Verona, Pa., assignor to Koppers Company, Inc., Pittsburgh, Pa., a corporation of Delaware No Drawing. Application March 23, 1946, Serial No. 656,783

9 Claims. (Cl. 260—668)

The present invention relates to a process for the synthesis of 1,2-dihydronaphthalene, and has more particular reference to the preparation of 1,2-dihydronaphthalene from intermediate oxidation products of tetralin.

A known process for the synthesis of 1,2-dihydronaphthalene, which has been used in organic synthesis and particularly in the manufacture of resins, requires the consumption of valuable chemicals, such as elemental sodium, as reactants and results in formation of both the 1,2- and the 1,4-dihydronaphthalene isomers.

A primary object of the present invention is the provision of an improved process for synthesis of 1,2-dihydronaphthalene from intermediate oxidation products of tetralin in high yields.

The invention has for other objects such other improvements and such other operative advantages or results as may be found to obtain in the processes hereinafter described or claimed.

The present invention comprises, briefly, the controlled vapor phase dehydration over an alumina-bearing catalyst, such as activated alumina or an active blend of alumina and silica, of alpha tetralol. The process is applicable where the alpha tetralol is employed in relatively pure state and where it is present in admixture with alpha tetralone such as may be prepared by air-oxidation of tetralin.

According to the present invention, alpha tetralone-alpha tetralol mixtures are produced by reacting tetralin with air or oxygen at atmospheric or superatmospheric pressures to form preponderantly tetralin peroxide. The tetralin peroxide may be subsequently decomposed with an aqueous solution of alkali-metal hydroxide to convert the peroxide to a mixture of alpha tetralol and alpha tetralone, which may be employed as a source material in the synthesis of the 1,2-dihydronaphthalene. Substantially pure alpha tetralol which may be derived from the said alpha tetralone and alpha tetralol mixture by hydrogenation over copper oxide-chromium oxide catalyst may also be employed as a starting reagent. The pure alpha tetralol or solution containing the same is vaporized and the vapors are passed over alumina-bearing catalyst such as activated alumina or an alumina-silica blend at a temperature between 290° and 350° C. in the presence of an inert diluent gas. The alpha tetralol is thereby dehydrated to form 1,2-dihydronaphthalene. The product is condensed and is then extracted with caustic to remove a minute amount of alpha naphthol which is also formed during the dehydration step. When substantially pure alpha tetralol is employed as the starting reagent, a product of about 98 per cent purity is obtained by the described procedure. After a mixture of the alcohol and the ketone has been dehydrated and extracted, the product is distilled at about 50–100 mm. Hg absolute pressure to separate 1,2-dihydronaphthalene from unreacted alpha tetralone. The use of a diluent inert gas, such as carbon dioxide, during the dehydration step is preferred because it aids in maintaining the tetralol in vapor phase and also assists in producing dihydronaphthalene of higher purity.

Example 1

A mixture of alpha tetralol and alpha tetralone from tetralin oxidation and containing approximately 60 per cent alpha tetralone and 40 per cent tetralol was vaporized and passed over activated alumina at 310° C., at atmospheric pressure and with a liquid space velocity of two. No loss in catalytic activity was noted over a period of operation of 60 hours. The product was extracted with aqueous caustic solution to remove a small amount of alpha naphthol and was distilled at 50 mm. Hg absolute pressure. The following fractions were obtained by the vacuum distillation:

| | Grams |
|---|---|
| 1,2-dihydronaphthalene | 1610 |
| Intermediate fraction | 106 |
| Tetralone fraction | 2200 |
| Residue | 133 |

A 1,2-dihydronaphthalene fraction of about 96 per cent purity was obtained. Fractional freezing of this product gave a slight increase in purity as determined by the freezing point, a two-step fractional crystallization raising the melting point of the obtained crystals from −9.9° to −8.5° C.

Example 2

Alpha tetralol of 98 per cent purity was dehydrated for a period of 15 hours over activated alumina under conditions similar to those described in Example 1. The condensed product was extracted with caustic to remove a trace of alpha naphthol. The 1,2-dihydronaphthalene so obtained was found by two methods of analysis to be substantially pure.

Example 3

Alpha tetralol and $CO_2$ in a molar ratio of 1 to 3.8 were mixed and passed over activated alumina at a temperature of 310°–320° C. and at atmospheric pressure for a period of 39 hours. The flow rate of tetralol to the dehydration unit corresponded to a liquid space velocity of 0.5. The product was washed with a caustic soda solution to remove a trace of alpha naphthol and subsequently distilled at 50 mm. Hg pressure to remove a small amount of higher boiling material. The freezing point of the distilled 1,2-dihydronaphthalene was −8.0° C.

The products obtained by the above specific examples were tested for the presence of 1,4-dihydronaphthalene and the results were negative. The 1,2-dihydronaphthalene that was prepared from pure alpha tetralol was found to be of slightly higher purity than that prepared from the alpha tetralone-alpha tetralol mixture.

The invention as hereinabove set forth is embodied in particular form and manner but may be variously embodied within the scope of the claims hereinafter made.

I claim:

1. A process for the synthesis of 1,2-dihydronaphthalene from solutions containing alpha tetralol comprising: passing vaporized alpha-tetralol-containing mixtures over an alumina-bearing catalyst at a temperature between about 290° and 350° C.

2. A process for the synthesis of 1,2-dihydronaphthalene from solutions containing alpha tetralol comprising: passing vaporized alpha-tetralol-containing mixtures in the presence of an inert diluent gas over an alumina-bearing catalyst at a temperature between about 290° and 350° C.

3. A process for the synthesis of 1,2-dihydronaphthalene from solutions containing alpha tetralol comprising: passing vaporized alpha-tetralol-containing mixtures over activated alumina at a temperature between about 290° and 350° C., and distilling 1,2-dihydronaphthalene from the condensed product under a vacuum of between 50 to 100 mm. Hg absolute pressure.

4. A process for the synthesis of 1,2-dihydronaphthalene from solutions containing alpha tetralol comprising: passing vaporized alpha-tetralol-containing mixtures in the presence of diluent carbon dioxide over activated alumina at a temperature between about 290° and 350° C.; condensing the vaporized product; extracting alpha naphthol therefrom with aqueous caustic solution; and distilling 1,2-dihydronaphthalene from the product, from which alpha naphthol has been extracted under a vacuum of between 50 to 100 mm. Hg absolute pressure.

5. A process for the synthesis of 1,2-dihydronaphthalene from solutions containing alpha tetralol comprising: passing vaporized alpha-tetralol-containing mixtures at a space velocity of about 2 over activated alumina at a temperature between about 290° and 350° C.

6. In a process for the synthesis of 1,2-dihydronaphthalene from tetralin in which the tetralin is partially oxidized to tetralin peroxide that is subsequently decomposed to form a mixture of alpha tetralol and alpha tetralone, the steps comprising: passing vaporized alpha tetralol-alpha tetralone mixture over activated alumina at a temperature between about 290° and 350° C.; and fractionally distilling the condensed product thereby to obtain substantially pure 1,2-dihydronaphthalene.

7. A process of producing 1,2-dihydronaphthalene comprising oxidizing tetralin with air at atmospheric pressure to form tetralin peroxide, treating the peroxide with an alkali-metal hydroxide to convert the peroxide to a mixture of alpha tetralol and alpha tetralone, hydrogenating the alcohol-ketone mixture over a copper oxide-chromium oxide catalyst, distilling the hydrogenated mixture to separate alpha tetralol and passing vaporized alpha tetralol over activated alumina at a temperature between 290° and 350° C.

8. A process as claimed in claim 1 in which the alumina-bearing catalyst is an active blend of alumina and silica.

9. A process of producing 1,2-dihydronapthalene comprising oxidizing tetralin with air at atmospheric pressure to form tetralin peroxide, treating the peroxide with an alkali-metal hydroxide to convert the peroxide to a mixture of alpha tetralol and alpha tetralone, hydrogenating the alcohol-ketone mixture over a copper oxide-chromium oxide catalyst, distilling the hydrogenated mixture to separate alpha tetralol and passing vaporized alpha tetralol over an alumina-silica blend.

ROBERT JOHNSON.

REFERENCES CITED

The following references are of record in the file of this patent:

UNITED STATES PATENTS

| Number | Name | Date |
|---|---|---|
| 1,999,061 | Schoeller et al. | Apr. 23, 1935 |